Figures 1, 2:
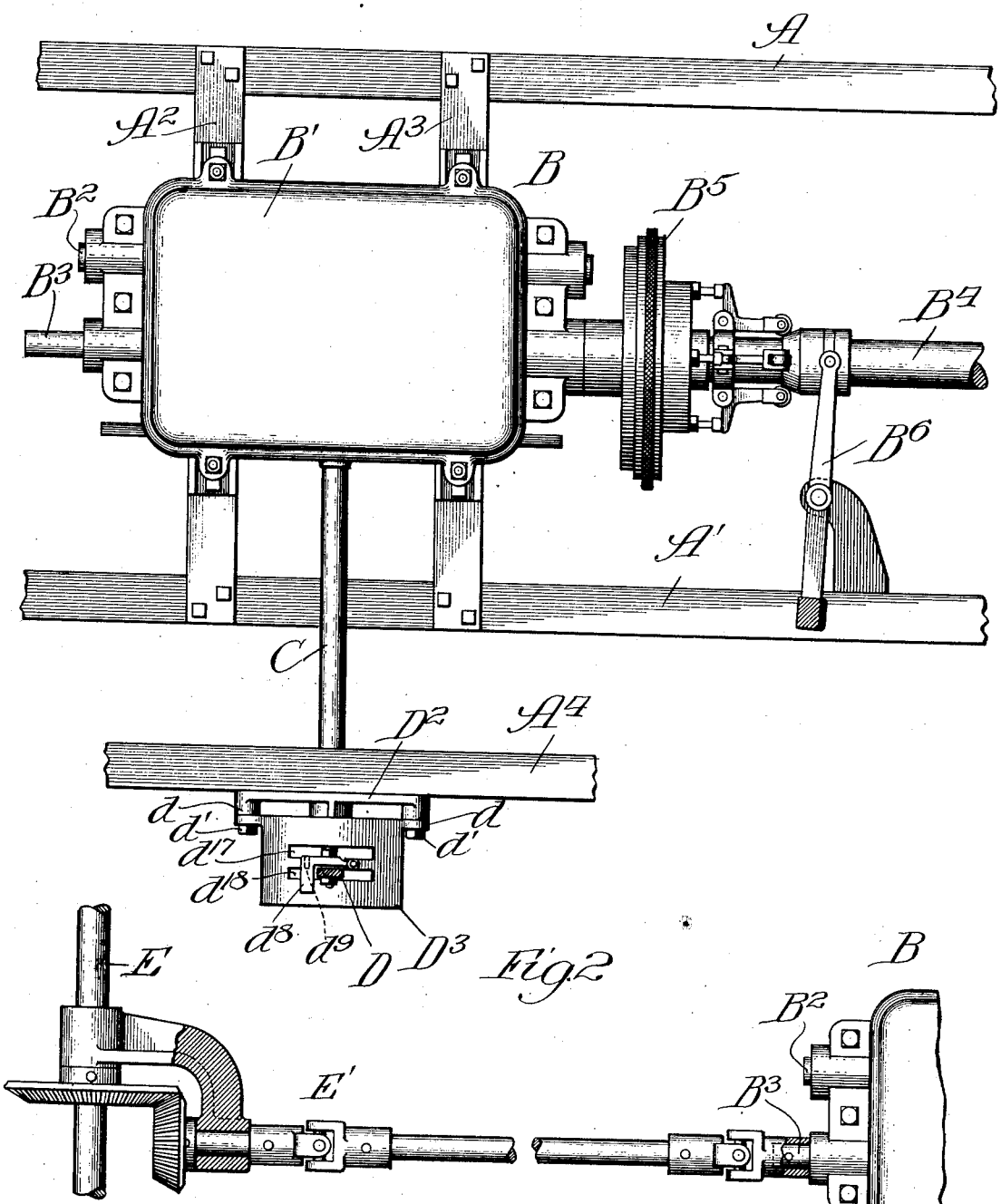

No. 826,851. PATENTED JULY 24, 1906.
M. HENDRICKSON.
POWER TRANSMISSION MECHANISM.
APPLICATION FILED OCT. 24, 1905.

4 SHEETS—SHEET 1.

Witnesses:
Inventor:
Magnus Hendrickson,

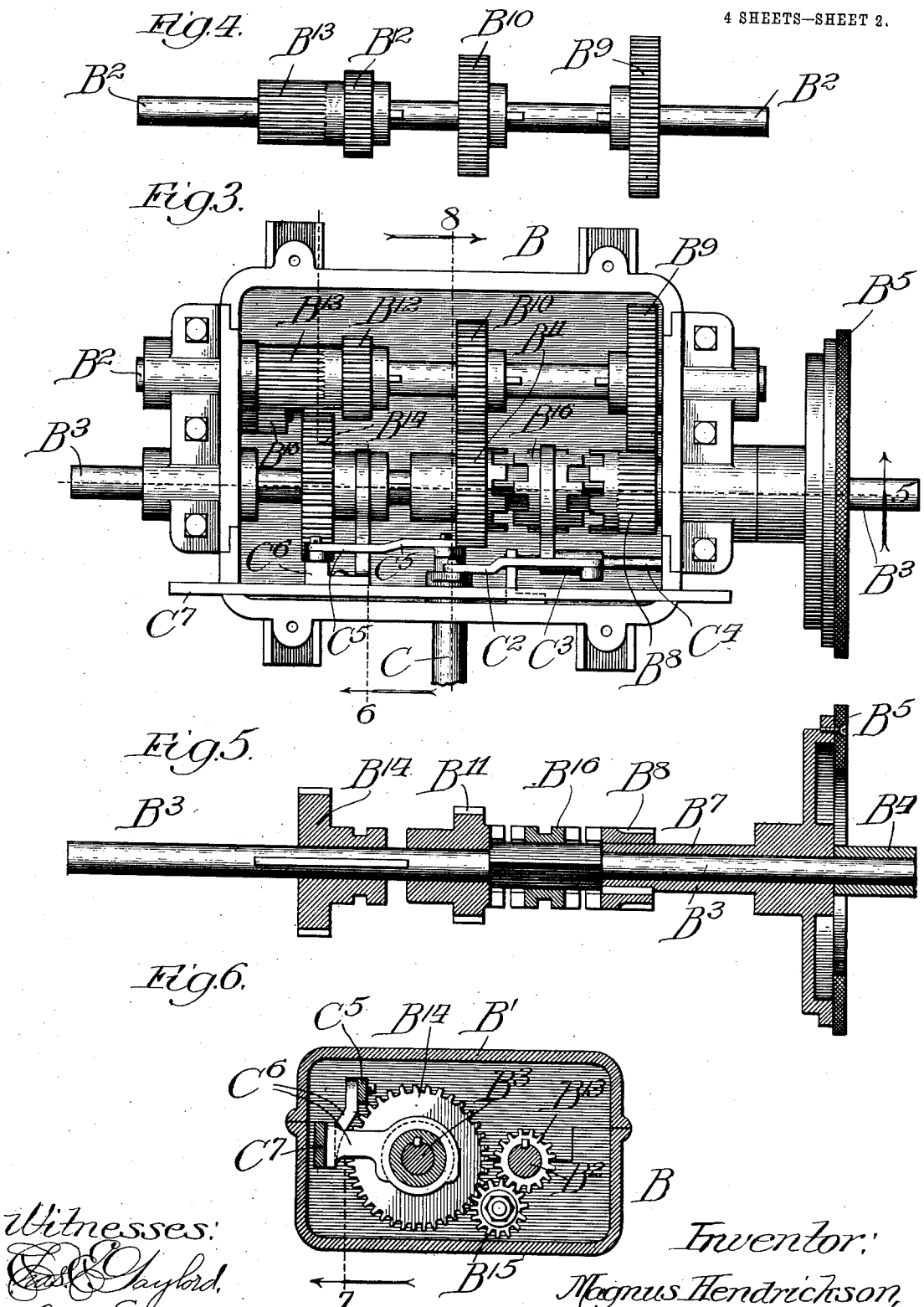

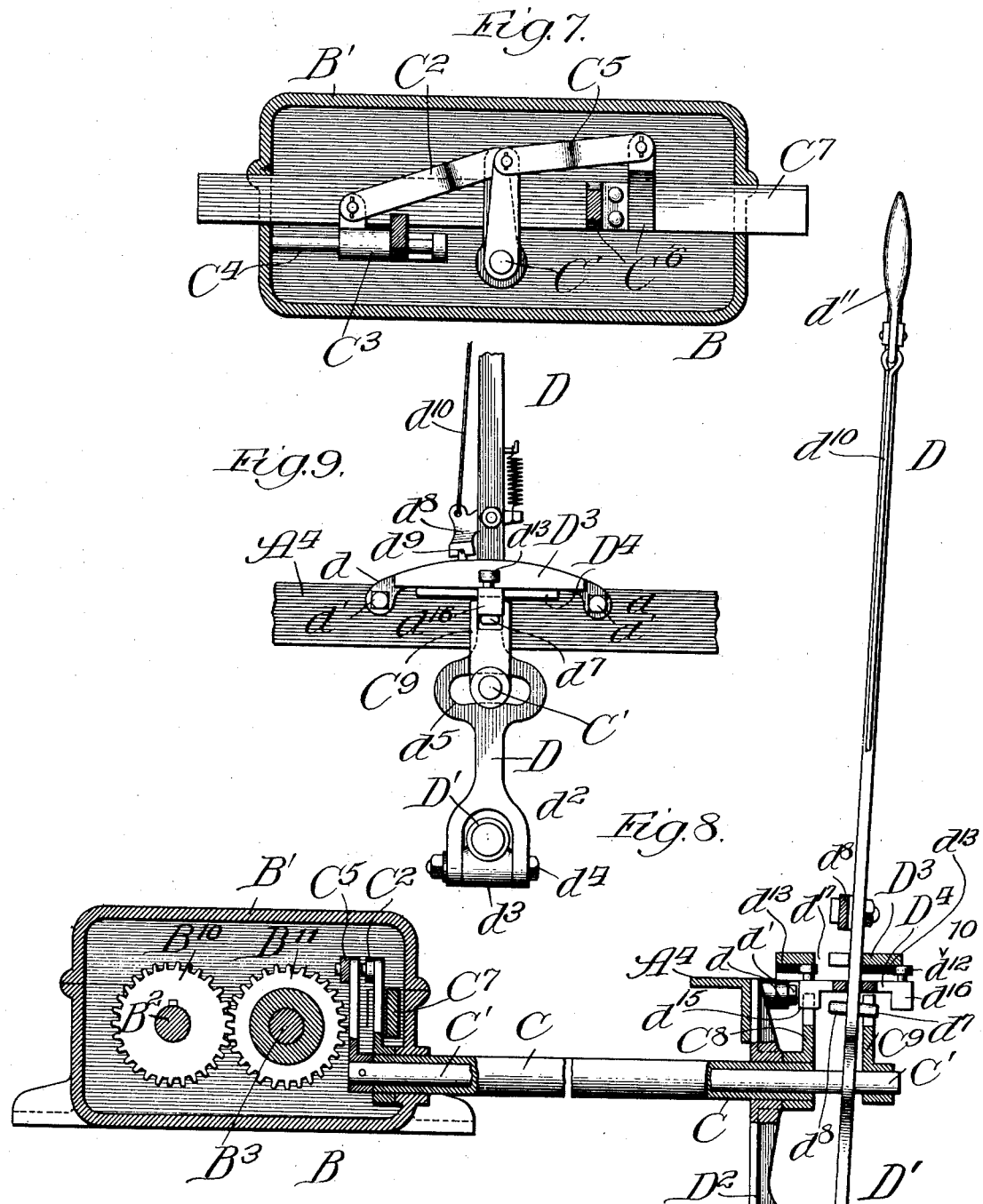

No. 826,851. PATENTED JULY 24, 1906.
M. HENDRICKSON.
POWER TRANSMISSION MECHANISM.
APPLICATION FILED OCT. 24, 1905.
4 SHEETS—SHEET 4.
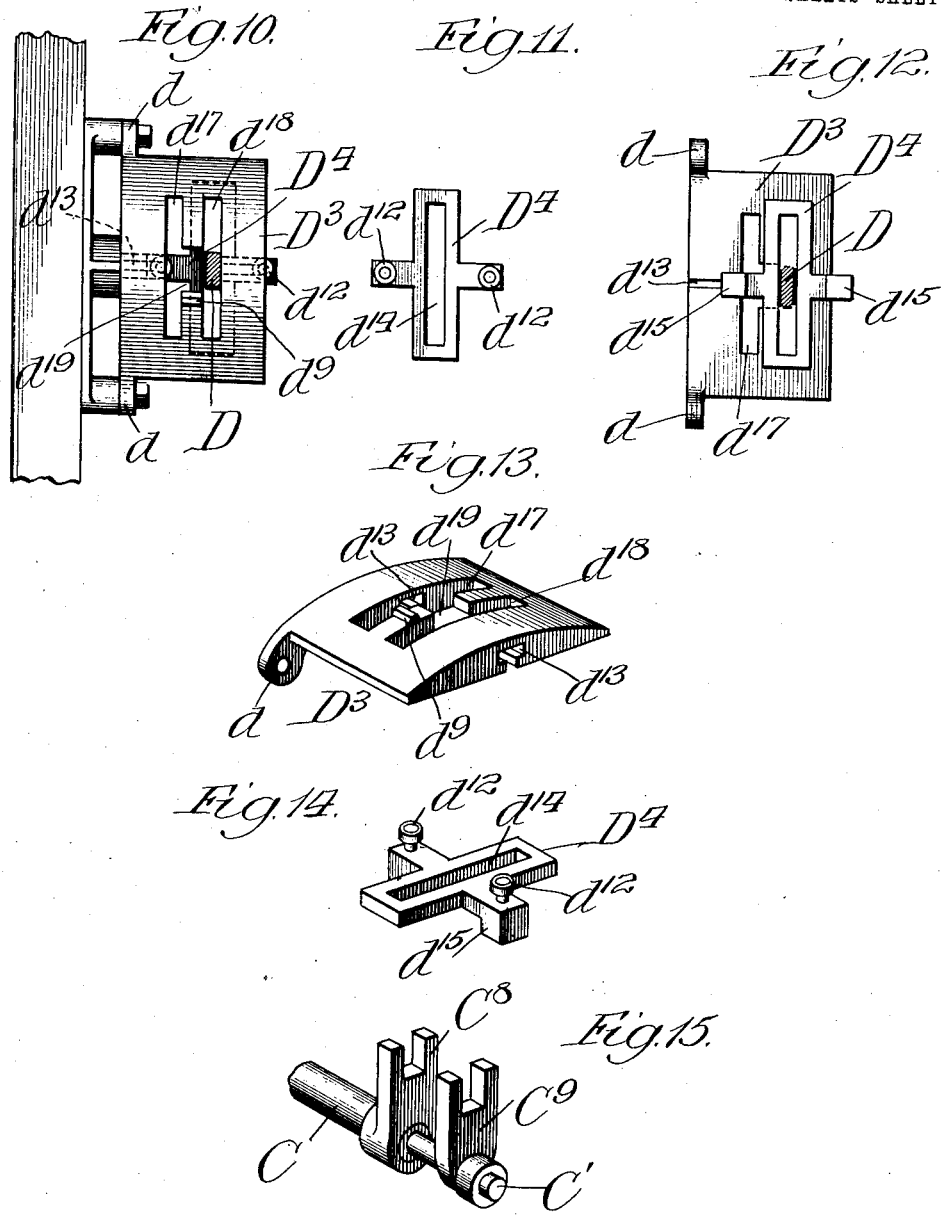
Witnesses:
Chas. E. Gaylord.
John Enders.
Inventor:
Magnus Hendrickson,
By Dyrenforth, Dyrenforth & Lee,
Attys.

UNITED STATES PATENT OFFICE.

MAGNUS HENDRICKSON, OF CHICAGO, ILLINOIS, ASSIGNOR TO JACOB LAUTH, OF CHICAGO, ILLINOIS.

POWER-TRANSMISSION MECHANISM.

No. 826,851.        Specification of Letters Patent.        Patented July 24, 1906.

Application filed October 24, 1905. Serial No. 284,194.

*To all whom it may concern:*

Be it known that I, MAGNUS HENDRICKSON, a citizen of the United States, residing at Chicago, in the county of Cook and State of Illinois, have invented a new and useful Power-Transmission Mechanism, of which the following is a specification.

My invention relates particularly to power-transmission mechanism for motor-vehicles; and my primary object is to provide for effecting several complex movements in regulating speed and direction, mechanism at once simple, reliable, and durable.

The invention is illustrated in its preferred embodiment in the accompanying drawings, in which—

Figure 1 is a broken plan view of a frame which may be mounted upon or constitute a portion of the running-gear frame of a motor-vehicle and upon which is mounted my improved power-transmission mechanism; Fig. 2, a broken plan view illustrating one manner of transmitting power from the transmission mechanism proper to the rear axle of the vehicle; Fig. 3, a plan view of the gear-casing with the top plate removed; Fig. 4, a view of one of the shafts of the gear mechanism; Fig. 5, a longitudinal section taken as indicated at line 5 of Fig. 3; Fig. 6, a transverse section taken as indicated at line 6 of Fig. 3; Fig. 7, a longitudinal section taken as indicated at line 7 of Fig. 6; Fig. 8, a broken transverse section taken as indicated at line 8 of Fig. 3, the section extending to the controlling-lever and its guard shown in Fig. 1, however; Fig. 9, a broken side view of the controlling-lever and its guard; Fig. 10, a section taken as indicated at line 10 of Fig. 8; Fig. 11, a plan view of a laterally-shiftable rock-shaft lock employed in connection with the controlling-lever; Fig. 12, a bottom plan view of the guard shown in Fig. 10 with the rock-shaft lock shown in Fig. 11 attached; Fig. 13, a perspective view of the guard shown in Fig. 10; Fig. 14, a perspective view of the lock shown in Fig. 11; and Fig. 15, a broken perspective view of a pair of rock-shafts and their actuating-arms, one of said shafts being tubular and receiving the other.

In the preferred construction illustrated in the accompanying drawings, A A' represent frame members, which may either constitute the side members of the running-gear frame or be supported thereon in any suitable manner; $A^2$ $A^3$, cross members supported on the members A A'; $A^4$, a frame member parallel with and adjacent to the member A' and which may be supported from the member A' or in any other suitable manner; B, a gear-casing having a removable top plate B' and bearings at the ends of the casing, in which are journaled longitudinal shafts $B^2$ $B^3$; $B^4$, a power-shaft, such as the shaft of an engine, joined by a clutch $B^5$, operated by a foot-lever $B^6$ to a sleeve $B^7$, journaled on the front end of the shaft $B^3$, as shown in detail in Fig. 5; $B^8$, a pinion fixed on the rear end of the sleeve or tubular shaft $B^7$ within the gear-casing and serving to actuate the shaft $B^2$ through the medium of the gear $B^9$; $B^{10}$ $B^{11}$, a pair of gears, the former fixed on the shaft $B^2$ and the latter journaled on the shaft $B^3$; $B^{12}$ $B^{13}$, pinions fixed on the shaft $B^2$ and serving to transmit power to a sliding gear $B^{14}$, splined on the shaft $B^3$, the pinion $B^{12}$ serving to transmit power directly to the pinion $B^{13}$ and serving to transmit power in a reverse direction through the medium of an idler-pinion $B^{15}$; $B^{16}$, a shiftable clutch member splined on the shaft $B^3$ between the pinion $B^8$ and the gear $B^{11}$, said pinion and gear being provided with coacting clutch members, as clearly shown in Fig. 3; C C', a pair of rock-shafts extending through one side of the gear-casing, the shaft C being tubular and the shaft C' extending through the shaft C; $C^2$, a connecting-rod joining a crank with which the shaft C is equipped within the gear-casing to a slide $C^3$, mounted on a guide $C^4$ and equipped with a yoke serving to shift the clutch $B^{16}$; $C^5$, a connecting-rod joining a crank with which the shaft C' is provided within the casing to a member $C^6$, firmly connected with a slide $C^7$ and equipped with a yoke serving to shift the gear $B^{14}$; $C^8$, a bifurcated actuating-arm secured on the outer end of the tubular rock-shaft C; $C^9$, a bifurcated actuating-arm secured on the outer end of the rock-shaft C'; D, a controlling-lever having universal connection D' with a hanger $D^2$, carried by the frame member $A^4$; $D^3$, a guard for the lever D, equipped with lugs $d$, joined by bolts $d'$ to the frame member $A^4$, the same bolts serving to secure the hanger $D^2$ to the frame member, and $D^4$ a transversely-shiftable rock-shaft lock connected with the guard $D^3$ and with the lever D.

The frame may be of any suitable construction and need not be described more in detail.

The gear-casing is intended to be oil and dust proof, and access to the interior is provided by means of the removable top plate B'. The feature of rock-shafts projecting into the gear-casing and provided within the casing with means for shifting the power-transmission members $B^{16}$ and $B^{14}$ is calculated to lend simplicity to the construction and contribute to the dust-proof character of the casing. It will be seen that when the clutch $B^5$ is operated to connect the short tubular shaft $B^7$ to the shaft $B^4$ motion will be imparted to the pinion $B^8$ and also to the shaft $B^2$ and the gears secured thereon. The gear $B^{11}$ will rotate continuously with the gear $B^{10}$, but at a slower rate of speed than the pinion $B^8$. When the clutch $B^{16}$ is thrown into engagement with the clutch of the gear $B^{11}$, power will be transmitted through the sleeve $B^7$ to the shaft $B^2$ and thence back through the gears $B^{10}$ and $B^{11}$ to the shaft $B^3$, so that the shaft $B^3$ will rotate in the same direction as the sleeve $B^7$, but at a slower speed. A slow speed either forward or backward is provided through the medium of the shiftable gear $B^{14}$, it being understood that with a slow speed a sliding gear may be safely employed, whereas with a high speed a sliding gear cannot be safely employed. As has been stated, the clutch $B^{16}$ is actuated through the medium of the tubular rock-shaft C, and the sliding gear $B^{14}$ is actuated through the medium of the inner rock-shaft C'.

The controlling-lever D, as stated, has universal connection with the hanger $D^2$. This is preferably provided by equipping the hanger with a stud $d^2$, upon which is journaled a sleeve $d^3$, joined by a pivot $d^4$ to the lower end of the lever. As shown clearly in Fig. 8, the outer end of the rock-shaft C is journaled in the hanger $D^2$, and the outer end of the rock-shaft C' projects beyond the outer end of the shaft C and passes through a perforate enlargement $d^5$ in the lever D, as best shown in Fig. 9. The lever is mounted to swing in a longitudinal plane, as well as a transverse plane, between the actuating-arms $C^8$ and $C^9$ of the rock-shafts C and C'. It is equipped with lateral studs $d^6$ $d^7$, which may be brought respectively into engagement with the slot of the arm $C^8$ or that of the arm $C^9$ at will. The normal position of the lever D is that shown in Fig. 9, which is the central position longitudinally and transversely. In this position the lever is locked to the guard $D^3$ by means of a spring-actuated pawl $d^8$, which engages a transverse tooth $d^9$ on the upper side of the guard. The pawl is released through the medium of a rod $d^{10}$ and a short lever $d^{11}$, mounted at the upper end of the lever D. The rock-shaft lock $D^4$ is equipped on its upper side with studs provided with rollers $d^{12}$, which move in a transverse guide-slot $d^{13}$, with which the guard $D^3$ is provided on its lower side. The member $D^4$ has a longitudinal slot $d^{14}$, in which the lever D works, and is provided with depending locking-lugs $d^{15}$ $d^{16}$. The guard is provided with longitudinal slots or channels $d^{17}$ $d^{18}$, joined at their centers by a transverse slot $d^{19}$. When the lever D is in the center of its longitudinal traverse, therefore, it may be shifted from one longitudinal slot to the other. When the lever occupies the longitudinal slot $d^{18}$, it is in position to turn the rock-shaft C' in either direction at will, thereby enabling the slowest speed forward or the reverse speed to be employed. When the controlling-lever occupies the longitudinal slot $d^{17}$, it may be thrown either rearwardly to connect the intermediate speed forward or forwardly to connect the highest speed forward at will. When the hand-lever D is moved in a transverse plane to the right to occupy the position shown in Fig. 8, the sliding lock $D^4$ is at the same time moved to the right, bringing the lug $d^{15}$ into position to lock the rock-shaft C, and when the lever D is shifted to the left to bring it into the plane of the longitudinal slot $d^{17}$ the slide $D^4$ is shifted to the left and brought into position to release the rock-shaft C and rock the shaft C'.

Power may be transmitted from the shaft $B^3$ to the rear axle E by means of the shaft-and-gear arrangement E', (shown in Fig. 2,) or any other suitable means of transmission may be provided.

The operation has already been sufficiently described, from which it will appear that the three speeds forward and a reverse, which ordinarily is deemed sufficient for motor-vehicle purposes, are effected by means of a single controlling-lever capable of swinging in both a longitudinal and a transverse plane.

What I regard as new, and desire to secure by Letters Patent, is—

1. In mechanism of the character described, the combination with shiftable transmission members, of a pair of rock-shafts serving to actuate the same and equipped with actuating-arms separated by a suitable space, a controlling-lever located between the planes of said arms and mounted to swing in both a longitudinal and transverse plane, means for effecting connection between said controlling lever and either one of the rock-shaft-actuating arms, and a transversely-shiftable slide equipped with locking means for the actuating-arms of the rock-shafts, said locking means being so disposed that when the controlling-lever is in position to actuate one rock-shaft the other rock-shaft will be locked, for the purpose set forth.

2. In mechanism of the character described, the combination with shiftable transmission elements, of a pair of rock-shafts serving to shift the same equipped with suitably-spaced actuating-arms, a universally-connected controlling-lever located between the planes of said arms, a guard for said lever provided with a plurality of longitudinal slots and a connecting-slot, and a locking member slidably connected with said guard and provided with a longitudinal slot receiving said lever, for the purpose set forth.

3. In mechanism of the character described, the combination of a tubular rock-shaft equipped with means for shifting a transmission element, a rock-shaft extending through said first-named shaft and equipped with means for shifting a transmission element, a pair of actuating-arms connected with the free ends of said rock-shafts, a controlling-lever located between the planes of said arms and recessed to receive the inner rock-shaft, connecting means between the controlling-lever and said arms whereby either arm may be actuated in either direction, a guard for said lever provided with a plurality of longitudinal channels and a connecting cross-channel, the latter channel being centrally located, and a locking member provided with means for engaging either one of said rock-shaft-actuating arms.

4. In mechanism of the character described, the combination with shiftable transmission elements, of a pair of rock-shafts connected therewith, a hanger in which said rock-shafts are journaled, a lever having universal connection with said hanger beneath the rock-shafts, a guard provided with a plurality of longitudinal slots for the lever, and rock-shaft-actuating means between the lever and rock-shafts, for the purpose set forth.

5. In mechanism of the character described, the combination of a tubular rock-shaft, a rock-shaft extending therethrough, actuating-arms connected with said rock-shafts and spaced to receive a controlling-lever between them, a guard provided with a plurality of longitudinal channels for the controlling-lever, and a central connecting-channel, a controlling-lever located in a plane between said actuating-arms and mounted to swing both longitudinally and transversely of the guard, and a transversely-shiftable longitudinally-slotted locking member depending from said guard and receiving said lever and equipped with means for engaging the actuating-arm of either rock-shaft at will.

6. In mechanism of the character described, the combination of a gear-casing, shafts journaled therein and equipped with transmission elements, a tubular rock-shaft extending into said casing and equipped within the casing with means for shifting a transmission element, a rock-shaft extending through said tubular rock-shaft and equipped within the casing with means for shifting a transmission element, and means for actuating either one of said rock-shafts at will, for the purpose set forth.

MAGNUS HENDRICKSON.

In presence of—
L. HEISLAR,
J. H. LAUDES.